Aug. 20, 1968     W. LUDLOFF     3,397,612
DEVICE FOR PHOTOGRAPHIC EXPOSURE, PREFERABLY FOR ENLARGERS
Filed July 7, 1965     3 Sheets-Sheet 1
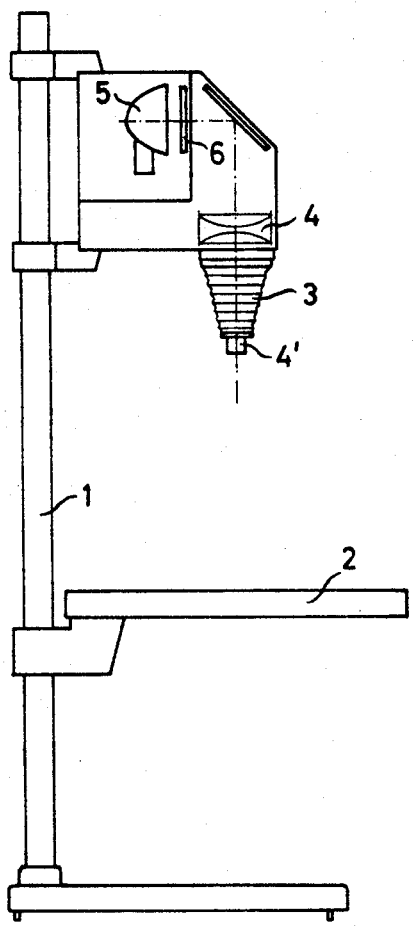
FIG. I
WOLFGANG LUDLOFF
                INVENTOR.
BY
Darbo, Robertson &
Vandenburgh
                Attys

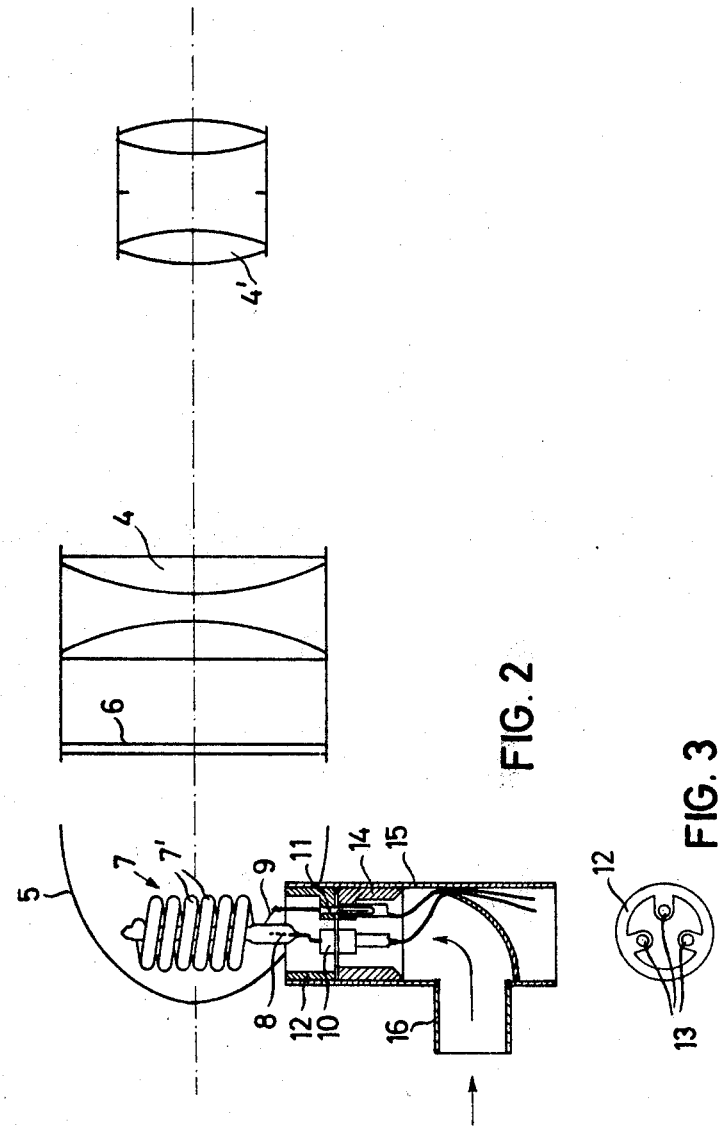

Aug. 20, 1968 W. LUDLOFF 3,397,612
DEVICE FOR PHOTOGRAPHIC EXPOSURE, PREFERABLY FOR ENLARGERS
Filed July 7, 1965 3 Sheets-Sheet 3

WOLFGANG LUDLOFF
INVENTOR.

BY
Darbo, Robertson &
Vandenburgh Attys

3,397,612
DEVICE FOR PHOTOGRAPHIC EXPOSURE, PREFERABLY FOR ENLARGERS
Wolfgang Ludloff, Porz-Westhoven, Germany, assignor to Gesellschaft fur Multiblitzgeräte, Dr. Ing. D. A. Mannesmann m.b.H., Porz-Westhoven, Germany
Filed July 7, 1965, Ser. No. 470,010
Claims priority, application Germany, July 16, 1964, G 41,098
10 Claims. (Cl. 88—24)

ABSTRACT OF THE DISCLOSURE

A repetitive flash illumination apparatus for photographic duplication devices such as an enlarger has a high voltage discharge lamp, including a tubular envelope, coiled into a cylinder. A cooling air flow is forced through the lamp socket and the cylinder. The power supply for the lamp has a relay controlled by a manually operable switch which gives a delayed energization of the apparatus after the switch is closed. One capacitor is connected in parallel with the discharge lamp. Through the use of a manually operable switch and a relay a second capacitor may selectively be connected in parallel with the first capacitor. The operation of the lamp is controlled through a tetrode having two grids. Controls are connected to one grid to control whether the lamp is operated or not and the second grid is connected to a timing circuit to produce repetitive flashing of the lamp when the lamp is set "on." The lamp is fired at a given frequency during a limited exposure time no greater than a given maximum time interval. The capacitance is such that it is charged to a lamp operating voltage at least at the given frequency and when discharging through the lamp produces no more heat in the lamp, by flashes at the given frequency and during the given maximum time interval, than that which will be substantially carried away by the cooling air flow without overheating the lamp.

---

The present invention relates to a device for photographic exposure, preferably for enlargers. It is a known fact, that when exposing photographic layers differences in density will be reproduced better if the exposure is not made by a continuous illumination but, instead, discontinuously by a plurality of flashes of light. Such as a "stroboscopic" exposure is produced in known manner by a flashlight discharge tube which supplies a plurality of flashes of light within the exposure time. However, considerable technical difficulties stand in the way of practical utilization of the known flashlight exposure effect, which are eliminated by the present invention. It is obvious that the effect attainable by the flashlight exposure will be more readily apparent, the shorter and more intensive are the individual flashes of light. Therefore, extremely short and intensive flashes of light must be produced and that is during a relatively long exposure time. Thus, different conditions prevail here than with the customary flashlight devices which achieve exposure only with an individual flash of light.

The invention consists in that with a "stroboscopic" exposure device of the type as herein described for producing the flashes of light by a capacitor of relatively low capacity and charged with a high voltage which discharges in a discharge lamp with long discharge gap. For the purpose of better optical focusing this lamp is coiled with small diameter and small distance of turns in a manner known per se and is cooled by means of an air current passed through the coil axis.

Of course, with individual flashlight devices it is known to charge a storage capacitor of relatively great capacity with high-voltage, that is a voltage of several thousand volts and to discharge the same via a coiled discharge lamp. Such high-voltage flashlight devices are considered obsolete and have been replaced during the last years by flashlight devices with electrolytic capacitors which discharge with approximately 500 volts only via a relatively short discharge gap with relatively long flashing time.

The obsolete high-voltage flashlight devices with coiled discharge lamps are neither adapted nor useful for a "stroboscopic" exposure, since the storage capacitor requires a charging time of several seconds which is, of course, only practicable for an individual flash of light.

It is an essential component of the invention that for producing the flashes of light with "stroboscopic" exposure the coiled high-voltage operated discharge lamps which are considered obsolete in the flashlight art are fallen back upon whereas up to now for "stroboscopic" exposure tubular discharge lamps have been used exclusively which cause great difficulties in the focusing of the light. The coiled high-voltage discharge lamps are utilized however, herein in contrast to the prior art high-voltage flashlight devices in connection with storage capacitors of low capacity the charging time of which is negligibly short. It has shown that such coiled high-voltage discharge lamps may be used for "stroboscopic" exposure devices if they are effectively cooled and that is by means of an air current passed through the coil axis.

Expediently, this is attained in that the cooling air current is passed through a hollow lamp socket and across the sealing points of the discharge electrodes, for the cooling of the electrode seal is of primary importance, which will become leaky under thermal load and lead to failure of the discharge lamp. By the hollow design of the lamp socket the cooling air current may directly reach the electrode connections of the discharge lamp and carry off heat therefrom. This cooling effect may still be improved if the electrode connections which protrude from the sealing points are adapted to have a large surface or are heat-conductingly connected with a metallic body of relatively large surface.

With enlargers which serve for producing color separations and screen photographs, the "stroboscopic" exposure by means of short intensive flashes of light is of particular importance on account of the better reproduction of the differences in density. By such an exposure harder high-contrast pictures and a sharper reproduction of the contours are obtained. The projection path of rays customary with such enlargers may be realized with the use of the described "stroboscopic" exposure device in that the discharge lamp is arranged within a reflector in front of a frosted glass pane. Up to now the enlargers serving for producing color separations and screen copies have been operated with a frosted glass filament lamp, as the tubular discharge lamps known for "stroboscopic" exposure did not allow a realization of the customary projection path of rays.

It has shown, that the "stroboscopic" high-voltage discharge in a long discharge gap does not commence immediately after switch-on of the ignition device. At the beginning, an indefinite number of the ignition pulses remain ineffective and do not initiate a flash of light, apparently because the state of ionization of the discharge gap is not yet sufficient for a discharge. By this phenomenon an exact proportioning of the exposure time is aggravated. In further modification of the invention provision is therefore made for eliminating this shortcoming, in that a switch switching on the ignition device of the discharge lamp is simultaneously effective to switch on a relay responding with delay, and which relay after a delay switches on the working voltage of the discharge lamp. Thereby, during the set delay period of the relay there will be a pre-ionization of the discharge gap prior to the application of the working voltage by the relay across the discharge lamp. This enables an exact proportioning of the exposure time by ensuring that the lamp will be fired immediately upon switch-on of the working voltage due to the pre-ionization.

Expediently, a tetrode serves for controlling the ignition voltage, one grid (control grid) defining the rhythm of the ignitions and the second grid serving for switching on and off the ignition.

For the practical operation of the exposure device it is of importance to have available a weaker optically equivalent adjustment illumination prior to the flashlight exposure. To attain the same, two storage capacitors are connected in parallel with one of the capacitors being switched on and off by a switch-operated relay. It is then possible to optionally utilize the capacity of the one being as a rule considerably smaller or the capacities of both capacitors.

To facilitate the handling of the device a remote control device connectable by a cable and containing the switches may be provided.

An embodiment of the invention is presented in the drawings with reference to FIGS. 1 to 4 and described as follows:

FIG. 1 shows an enlarger for producing color separations and screen copies;

FIG. 2 illustrates the exposure device on an enlarged scale;

FIG. 3 is a section through the lamp socket;

Figure 4:
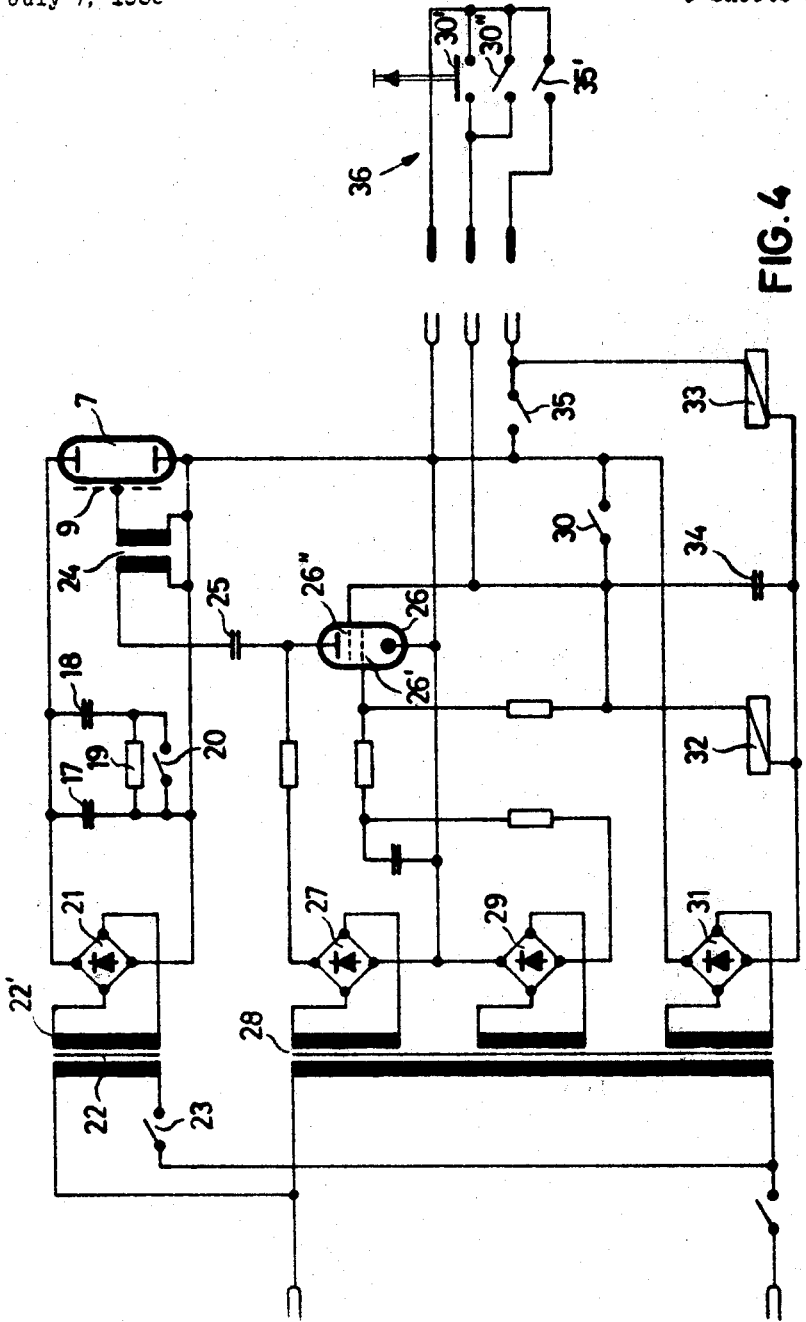
FIG. 4 is a circuit diagram of the exposure device.

The enlarger comprises a vertically adjustable table 2 mounted on a support 1. In known manner this table 2 has projected thereupon the pattern by means of a projection camera 3 via condensor 4 and objective 4'. A flashlight discharge lamp 7 uniformly illuminating a frosted glas pane 6, arranged in a reflector 5 serves as source of light.

The flashlight discharge lamp 7 is designed as high-voltage lamp, the discharge gap of which is formed by a tubular envelope coiled into narrow coils 7'. The sealed electrodes 8 and the ignition electrode 9 are connected with pins 10, 11 which are retained in a hollow lamp socket 12 by inwardly facing webs 13. The female portion 14 of the lamp socket plug is adapted to be hollow accordingly and arranged in a lamp support 15 having a lateral connection piece 16. A cooling air current is blown through the connection piece 16. This air current passes through the hollow parts 12, 14 across the sealing points of the electrodes 8 and internally through the coil 7'. Thereby, an intensive cooling primarily of the electrodes 8 and also of the coil 7' is achieved.

As seen in FIG. 3, the discharge lamp 7 connects to two storage capacitors 17, 18 which are connected in parallel relative to each other via a decoupling resistor 19 and a relay contact 20 bridging the resistor. The capacitor 17 has a capacity of 0.1 pf. while the capacitor 18 has a substantially greater capacity of 1 pf. which, however, compared with customary storage capacitors of individual flashlight devices is very small. The storage capacitors 17, 18 are charged with a high voltage of 3200 volts via a full wave rectifier 21, which voltage is supplied from the secondary winding 22' of a mains transformer 22. On the side of the primary winding the transformer 22 may be connected to the mains through a relay contact 23. When relay contact 23 is closed the storage capacitors 17, 18 obtain high-voltage pulses of double the mains frequency and the discharge of the capacitors 17, 18 is effected in the same rhythm if the discharge lamp 7 at the ignition electrode 9 thereof obtains corresponding ignition pulses. The ignition electrode 9 is connected on the side of the secondary winding to an ignition transformer 24 with the primary winding of which an ignition capacitor 25 and a thyratron 26 are in series connection. The anode voltage of 500 volts with which the ignition capacitor 25 is charged, is supplied from a full wave rectifier 27 being supplied by a mains transformer 28. The mains transformer 28 simultaneously supplies a further full wave rectifier 29 with a voltage of 20 volts producing negative control pulses of double the mains frequency across the control grid 26' of thyratron 26. A second grid 26" of thyratron 26 may be connected to ground by a switch 30 and thereby the blocking effect thereof may be cancelled. If switch 30 is closed, the thyratron 26 becomes conducting in the rhythm of the control pulses occurring across control grid 26' so that the ignition capacitor 25 will discharge with corresponding ignition pulses occurring across the ignition electrode 9. Thus, the rhythm of the ignition pulses is determined by the control pulses across control grid 26' while the switch-on and switch-off of the ignition is effected by grid 26" and switch 30, respectively.

The mains transformer 28 supplies a further full wave rectifier 31 supplying a low auxiliary voltage of 6 volts. Relays 32, 33 are connected to the full wave rectifier 31. Relay 32 is also switched on by switch 30. A parallely connected capacitor 34 is effective to cause relay 32 to switch on its make contact 23 with a specific delay. Relay 33 is switched on by a switch 35 and actuates the make contact 20 thereof without delay.

By the actuation of switch 30 the ignition is switched on so that ignition pulses occur across the ignition grid 9 of the discharge lamp 7. However, since the relay contact 23 is open at first, thus, the discharge lamp 7 does not yet obtain working voltage, the first ignition pulses are effective to cause a pre-ionization of the discharge gap without discharges taking place. With the closing of switch 30, the time-delay relay 32 is simultaneously switched on. After a delay, relay 32 closes the make contact 23 and switches on the working voltage. As at this moment the discharge gap is already pre-ionized, after closing of the relay contact 23 a discharge through the discharge lamp 7 does already take place with the occurrence of the first high-voltage pulse at the storage capacitors 17, 18. As long as switch 30 is closed, the discharges take place with double the mains frequency and produce very short intensive flashes of light.

With open relay contact 20 only the smaller storage capacitor 17 is operative so that a weaker stroboscopic adjustment illumination is obtained. Upon actuation of switch 35, however, relay contact 20 will be closed by relay 33. Now, during the actual exposure time both storage capacitors 17, 18 are acting so that a substantially more intensive stroboscopic exposure will be attained.

To make the control switches 30, 35 more readily accessible during work in the darkroom, a remote control device 36 is provided connectable by a cable, comprising a key switch 30', a toggle switch 30" and a switch 35'. Then, by actuating the toggle switch 30", the adjustment illumination may be switched on. After opening the toggle switch 30" throwing of the toggle switch 35' is then effective to cause a change-over to "exposure" and by actuating the key 30' exposure may be effected.

The invention is claimed as follows:

1. An apparatus for use with a source of electricity for producing photographic illumination for photographic duplication devices such as an enlarger, said apparatus comprising:

a high voltage discharge lamp including a tubular envelope defining a discharge gap therewithin, said envelope being in a coiled cylinder, hollow in the center;

electric supply means adapted to be connected to said source and connected to said lamp, said supply means including capacitor means and charging means for the capacitor, said supply means being connected to said lamp to repeatedly fire the lamp at a frequency during a limited exposure time no greater than a given maximum time interval; and means associated with said lamp to produce a forced flow of cooling air through the hollow center of the lamp;

said capacitor means having a capacitance such that it is charged to said high voltage by the charging means at least at said frequency and when discharging through the lamp will produce no more heat in the lamp, by flashes at said frequency and during said maximum time interval, than that which will be substantially carried away by said cooling air flow without overheating the lamp.

2. An apparatus as set forth in claim 1, wherein said lamp includes discharge electrodes sealed into the envelope at sealing points, and said apparatus includes hollow lamp socket means receiving said lamp, said socket means permitting said cooling air flow to pass across said sealing points.

3. An apparatus as set forth in claim 2, wherein said supply means includes a manually operable switch and delayed acting relay means, said switch being connected to the relay means to actuate the relay means, said relay means switching on the working voltage of the discharge lamp with a delay after said switch is manually operated.

4. An apparatus as set forth in claim 3, wherein said supply means includes a tetrode, said tetrode controlling the ignition voltage of the lamp, said tetrode having one grid connected to control the frequency of the lamp firing, and a second grid connected to said manually operable switch for switching the ignition on or off.

5. An apparatus as set forth in claim 4, wherein said capacitor means two capacitors, one capacitor being connected across said lamp, and manually operable means to selectively connect the other capacitor in parallel with said one capacitor.

6. An apparatus as set forth in claim 5, wherein the manually operable means includes a relay and a switch controlling the operation of the relay.

7. An apparatus as set forth in claim 1, wherein said supply means includes a manually operable switch and delayed acting relays means, said switch being connected to the relay means to actuate the relay means, said relay means switching on the working voltage of the discharge lamp with a delay after said switch is manually operated.

8. An apparatus as set forth in claim 7, wherein said supply means includes a tetrode, said tetrode controlling the ignition voltage of the lamp, said tetrode having one grid connected to control the frequency of the lamp firing, and a second grid connected to said manually operable switch for switching the ignition on or off.

9. An apparatus as set forth in claim 7, wherein said capacitor means two capacitors, one capacitor being connected across said lamp, and manually operable means to selectively connected the other capacitor in parallel with said one capacitor.

10. An apparatus as set forth in claim 1, wherein said capacitor means two capacitors, one capacitor being connected across said lamp, and manually operable means to selectively connected the other capacitor in parallel with said one capacitor.

References Cited

UNITED STATES PATENTS

| | | | |
|---|---|---|---|
| 2,331,317 | 10/1943 | Germeshausen | 315—241 |
| 2,498,640 | 2/1950 | Beck | 315—241 |
| 2,936,387 | 5/1960 | Steele et al. | 315—241 |
| 2,993,144 | 7/1961 | Grabner et al. | 315—241 |
| 3,009,053 | 11/1961 | Shaw et al. | 240—47 |
| 3,174,076 | 3/1965 | Michalski | 315—241 |

NORTON ANSHER, *Primary Examiner.*

WAYNE A. SIVERTSON, *Assistant Examiner.*